United States Patent
Erol et al.

(10) Patent No.: US 7,664,733 B2
(45) Date of Patent: Feb. 16, 2010

(54) TECHNIQUES FOR PERFORMING OPERATIONS ON A SOURCE SYMBOLIC DOCUMENT

(75) Inventors: Berna Erol, Burlingame, CA (US); Jonathan Hull, San Carlos, CA (US); Dar-Shyang Lee, Union City, CA (US)

(73) Assignee: Ricoh Company, Ltd., Tokyo (JP)

( * ) Notice: Subject to any disclaimer, the term of this patent is extended or adjusted under 35 U.S.C. 154(b) by 344 days.

(21) Appl. No.: 10/661,052

(22) Filed: Sep. 12, 2003

(65) Prior Publication Data

US 2004/0205041 A1  Oct. 14, 2004

Related U.S. Application Data

(60) Provisional application No. 60/462,412, filed on Apr. 11, 2003.

(51) Int. Cl.
G06F 17/30 (2006.01)
(52) U.S. Cl. ........................................ 707/3; 707/104.1
(58) Field of Classification Search ............... 715/500.1; 704/3; 707/1, 3, 100, 104.1; 386/69
See application file for complete search history.

(56) References Cited

U.S. PATENT DOCUMENTS

| | | | |
|---|---|---|---|
| 5,583,980 A | 12/1996 | Anderson | |
| 5,960,448 A | 9/1999 | Reichek et al. | |
| 5,974,372 A * | 10/1999 | Barnes et al. | 704/8 |
| 6,122,647 A | 9/2000 | Horowitz et al. | |
| 6,243,713 B1 | 6/2001 | Nelson et al. | |
| 6,370,498 B1 | 4/2002 | Flores et al. | |
| 6,404,925 B1 | 6/2002 | Foote et al. | |
| 6,560,637 B1 | 5/2003 | Dunlap et al. | |
| RE38,284 E | 10/2003 | Allen et al. | |
| 6,636,238 B1 | 10/2003 | Amir et al. | |
| 6,646,655 B1 | 11/2003 | Brandt et al. | |
| 6,701,014 B1 * | 3/2004 | Syeda-Mahmood | 382/199 |
| 6,732,915 B1 | 5/2004 | Nelson et al. | |
| 6,825,849 B1 | 11/2004 | Minakuchi et al. | |

(Continued)

FOREIGN PATENT DOCUMENTS

EP  0 459 793 A1  12/1991

(Continued)

OTHER PUBLICATIONS

Weber, et al., "Live documents with contextual, data-driven information components", Proceedings of the 20th annual international conference on Computer documentation table of contents, Oct. 2002, P-236-247. Retrieved from the Internet:<URL: http://portal.acm.org/ft_gateway.cfm?id=584990&type=pdf&coll=ACM&dl=ACM&CFID=52114454&CFTOKEN=66592544>.*

(Continued)

*Primary Examiner*—John E Breene
*Assistant Examiner*—Dennis Myint
(74) *Attorney, Agent, or Firm*—Townsend and Townsend and Crew LLP

(57) ABSTRACT

Recorded information is accessed. A source document is determined using the recorded information. If a criterion is satisfied based on the recorded information and the source document, an action to be performed is determined. The action is then performed if it is determined that the criterion is satisfied.

71 Claims, 5 Drawing Sheets

U.S. PATENT DOCUMENTS

| | | | |
|---|---|---|---|
| 6,839,059 B1 * | 1/2005 | Anderson et al. | 345/501 |
| 7,051,276 B1 | 5/2006 | Mogilevsky et al. | |
| 7,121,469 B2 | 10/2006 | Dorai et al. | |
| 7,206,773 B2 | 4/2007 | Erol et al. | |
| 7,236,632 B2 | 6/2007 | Erol et al. | |
| 7,248,782 B2 | 7/2007 | Kasutani | |
| 7,263,659 B2 | 8/2007 | Hull et al. | |
| 7,266,568 B1 | 9/2007 | Erol et al. | |
| 7,281,199 B1 | 10/2007 | Nicol et al. | |
| 7,394,938 B2 | 7/2008 | Erol et al. | |
| 2002/0034373 A1 | 3/2002 | Morita et al. | |
| 2002/0056082 A1 | 5/2002 | Hull et al. | |
| 2002/0120939 A1 | 8/2002 | Wall et al. | |
| 2002/0164151 A1 * | 11/2002 | Jasinschi et al. | 386/69 |
| 2002/0191013 A1 | 12/2002 | Abrams | |
| 2003/0009342 A1 | 1/2003 | Haley | |
| 2003/0011684 A1 * | 1/2003 | Narayanaswami et al. | 348/207.99 |
| 2003/0101043 A1 * | 5/2003 | Boegelund et al. | 704/3 |
| 2003/0169461 A1 | 9/2003 | Garbel et al. | |
| 2003/0191633 A1 * | 10/2003 | Berger | 704/205 |
| 2004/0133845 A1 | 7/2004 | Forstall et al. | |
| 2004/0205477 A1 * | 10/2004 | Lin | 715/500.1 |
| 2004/0205478 A1 | 10/2004 | Lin et al. | |
| 2004/0205601 A1 * | 10/2004 | Smith | 715/516 |
| 2005/0041872 A1 | 2/2005 | Yim et al. | |
| 2005/0084154 A1 | 4/2005 | Li et al. | |
| 2006/0002607 A1 | 1/2006 | Boncyk et al. | |
| 2006/0285772 A1 | 12/2006 | Hull et al. | |
| 2007/0127823 A1 | 6/2007 | Seeber | |
| 2007/0204229 A1 | 8/2007 | Erol et al. | |
| 2007/0288523 A1 | 12/2007 | Erol et al. | |

FOREIGN PATENT DOCUMENTS

| | | |
|---|---|---|
| JP | 2001-318919 A | 11/2001 |
| JP | 2002-207773 A | 7/2002 |
| JP | 2002-538536 A | 11/2002 |
| JP | 2002-544596 A | 12/2002 |
| WO | WO 99/50736 A1 | 10/1999 |
| WO | WO 00/52596 A2 | 9/2000 |

OTHER PUBLICATIONS

Chiu et al., "LiteMinutes: an Internet-based system for multimedia meeting minutes", Proceedings of the 10th international conference on World Wide Web, May 2001, P140-149. Retrieved from the Internet<URL: http://portal.acm.org/ft_gateway.cfm?id=371971&type=pdf&coll=ACM&dl=ACM&CFID=52114454&CFTOKEN=66592544>.*

Stifelman, "The Audio Notebook: Paper and Pen Interaction with Structured Speech;" Sep. 1997; Ph.D Thesis; Massachusetts Institute of Technology.

Stifelman, et al.; "The Audio Notebook: paper and pen interaction with structured speech;" Proc. of International Conf. on Human Factors in Computing Systems Mar. 31-Apr. 5, 2001; pp. 182-189; CHI.

Web page; "TELEform V7—Digitate Beleglesung, Automatische Datenerfassung aus Formularen;" Form-Solutions; at URL=http://www.form-solutions.net/dl/Teleform.pdf>; printed Feb. 10, 2005; 5 pages.

Web page; "Xerox Office Software Suite FlowPort Version 2.1.1;" Capture and Distribution; at URL=http://www.xrce.xerox.com/showroom/pdf/flowport.pdf>; printed Feb. 10, 2005; 4 pages.

Won et al.; "Efficient Use of MPEG-7 Edge Histogram Descriptor;" ETRI Journal; Feb. 2002; pp. 23-30; vol. 24; No. 1.

U.S. Appl. No. 12/350,900, filed Jan. 8, 2009, Erol et al.

U.S. Appl. No. 10/696,735, filed Oct. 28, 2003, Erol et al.

Stricker et al., "Similarity of Color Images," SPIE 95, 1995, pp. 1-12, San Jose.

Peng et al., "Document image template matching based on component block list," Pattern Recognition Letter 22, 2001, pp. 1033-1042, Elsevier Science B.V.

Non-Final Office Action for U.S. Appl. No. 10/660,985, mailed May 22, 2006, 10 pages.

Non-Final Office Action for U.S. Appl. No. 10/660,985, mailed Nov. 14, 2006, 8 pages.

Notice of Allowance for U.S. Appl. No. 10/660,985, mailed May 3, 2007, 15 pages.

Non-Final Office Action for U.S. Appl. No. 10/660,867, mailed May 15, 2006, 11 pages.

Notice of Allowance for U.S. Appl. No. 10/660,867, mailed Nov. 1, 2006, 9 pages.

Notice of Allowance for U.S. Appl. No. 10/696,735, mailed Oct. 8, 2008, 15 pages.

Notice of Allowance for U.S. Appl. No. 12/350,900, mailed Jul. 13, 2009, 9 pages.

Non-Final Office Action for U.S. Appl. No. 11/617,177, mailed Apr. 16, 2009, 18 pages.

Non-Final Office Action for U.S. Appl. No. 11/617,177, mailed Jun. 22, 2009, 19 pages.

Requirement for Restriction/Election for U.S. Appl. No. 10/412,757, mailed Oct. 31, 2006, 4 pages.

Notice of Allowance for U.S. Appl. No. 10/412,757, mailed Feb. 27, 2007, 12 pages.

Non-Final Office Action for U.S. Appl. No. 11/749,606, mailed Dec. 12, 2007, 6 pages.

Notice of Allowance for U.S. Appl. No. 11/749,606, mailed Feb. 15, 2008, 6 pages.

Notice of Allowance for U.S. Appl. No. 11/749,606, mailed Mar. 10, 2008, 1 page.

Brotherton et al., "Automated Capture, Integration, and Visualization of Multiple Media Streams," Proceedings of IEEE Multimedia '98, (1998).

Chiu et al., "Room with a Rear View: Meeting Capture in a Multimedia Conference Room," IEEE Multimedia Magazine, 7(4):48-54 (2000).

Chiu et al., "Automatically Linking Multimedia Meeting Documents by Image Matching," Proceedings of Hypertext '00, ACM Press, pp. 244-245 (2000).

Franklin et al., "Jabberwocky: you don't have to be a rocket scientist to change slides for a hydrogen combustion lecture," Intelligent User Interfaces, pp. 98-105 (2000).

Lee et al., "Portable Meeting Recorder," ACM Multimedia Conference, 2002.

Lienhart et al., "Localizing and Segmenting Text in Images, Videos and Web Pages," IEEE Transactions On CSVT, pp. 256-268 (2002).

Mukhopadhyay et al., "Passive capture and structuring of lectures," ACM Multimedia, pp. 477-487, (1999).

Muller et al., "The 'Authoring of the Fly' system for Automated Recording and Replay of (Tele)presentations," ACM/Springer Multimedia Systems Journal, vol. 8, No. 3 (2000).

Multi-university Research Laboratory, murl.microsoft.com; webpage printed Feb. 18, 2004.

Otsu, N., "A threshold selection method from gray-level histograms," IEEE Transactions on Systems, Man and Cybernetics, pp. 62-66 (1979).

Pimentel et al., "Linking by Interacting: a Paradigm for Authoring Hypertext," Proceedings of ACM Hypertext '2000, May 2000.

Scansoft Capture Development System, www.scansoft.com; webpage printed Feb. 18, 2004.

Trier et al., "Goal-Directed Evaluation of Binarization Methods," IEEE Transactions on Pattern Analysis and Machine Intelligence, pp. 1191-1201 (1995).

Waibel et al., "Advances in automatic meeting record creation and access," Proceedings of ICASSP, Seattle (2001).

Brotherton et al., "Automated Capture, Integration, and Visualization of Multiple Media Streams," Proceedings of IEEE Multimedia '98, (1998).

Chiu et al., "Room with a Rear View: Meeting Capture in a Multimedia Conference Room," IEEE Multimedia Magazine, 7(4):48-54 (2000).

Chiu et al., "Automatically Linking Multimedia Meeting Documents by Image Matching," *Proceedings of Hypertext '00*, ACM Press, pp. 244-245 (2000).

Franklin et al., "Jabberwocky: you don't have to be a rocket scientist to change slides for a hydrogen combustion lecture," *Intelligent User Interfaces*, pp. 98-105 (2000).

Lee et al., "Portable Meeting Recorder," *Acm Multimedia Conference*, 2002.

Lienhart et al., "Localizing and Segmenting Text in Images, Videos and Web Pages," IEEE *Transactions on CSVT*, pp. 256-268 (2002).

Mukhopadhyay et al., "Passive capture and structuring of lectures," *ACM Multimedia*, pp. 477-487.

Muller et al., "The 'Authoring of the Fly' system for Automated Recording and Replay of (Tele)presentations," *ACM/Springer Multimedia Systems Journal*, vol. 8, No. 3 (2000).

Multi-university Research Laboratory, murl.microsoft.com; webpage printed Feb. 18, 2004.

Otsu, N., "A threshold selection method from gray-level histograms," *IEEE Transactions on Systems. Man and Cybernetics*, pp. 62-66 (1979).

Pimentel et al., "Linking by Interacting: a Paradigm for Authoring Hypertext," *Proceedings of ACM Hypertex '2000*, May 2000.

Scansoft Capture Development System, www.scansoft.com; webpage printed Feb. 18, 2004.

Transym OCR engine, http://www.transym.com/.

Trier et al., "Goal-Directed Evaluation of Binarization Methods," *IEEE Transactions on Pattern Analysis and Machine Intelligence*, pp. 1191-1201 (1995).

Waibel et al., "Advances in automatic meeting record creation and access," *Proceedings of ICASSP*, Seattle (2001).

WebEx Presentation Studio, presenter.com.

Notice of Allowance for U.S. Appl. No. 10/696,735, mailed Aug. 17, 2009, 6 pages.

Supplemental Notice of Allowance for U.S. Appl. No. 10/696,735, mailed Sep. 3, 2009, 2 pages.

Interview Summary for U.S. Appl. No. 10/696,735, mailed Sep. 3, 2009, 3 pages.

Notice of Allowance for U.S. Appl. No. 12/350,900, mailed Sep. 18, 2009, 9 pages.

* cited by examiner

TECHNIQUES FOR PERFORMING OPERATIONS ON A SOURCE SYMBOLIC DOCUMENT

CROSS-REFERENCES TO RELATED APPLICATIONS

The present application is a non-provisional of and claims priority from U.S. Provisional Application No. 60/462,412, filed Apr. 11, 2003, the entire contents of which are herein incorporated by reference for all purposes.

The present application incorporates by reference for all purposes the entire contents of the following:

U.S. application Ser. No. 10/412,757, filed Apr. 11, 2003;

U.S. application Ser. No. 10/660,985, filed concurrently with the present application;

U.S. application Ser. No. 10/660,867, filed concurrently with the present application; and U.S. application Ser. No. 10/001,895, filed Nov. 19, 2001.

BACKGROUND OF THE INVENTION

The present invention generally relates to techniques for determining actions to perform and more specifically to techniques for using recorded information and portions of a source document to determine actions to perform.

Presentations are a powerful tool for presenting information to participants. During the presentation, slides from a source document are outputted and displayed while a presenter may describe or provide explanation for the outputted slides. At certain points during the presentation, certain actions may be desired. For example, a participant may want to view a translated slide of the outputted slide. Conventionally, in order to view the translated slide, a participant must recognize that a certain slide has been outputted and then manually initiate a translation program to translate the outputted slide or manually retrieve a pre-translated slide that corresponds to the outputted slide.

In addition to the above action, other actions may be desired, such as notifying participants that a presentation has started when a first slide in a source document is outputted and displayed. Also, different actions may be desired when different slides are outputted and displayed. For example, a video may be played or an e-mail may be sent when a certain slide is outputted. Conventionally, these actions are performed manually.

Accordingly, there is a need for automated techniques for determining actions to perform based on recorded information of an outputted slide from a source document.

BRIEF SUMMARY OF THE INVENTION

Embodiments of the present invention generally relate to determining actions to perform. Embodiments of the present invention access recorded information. A source document is then determined using the recorded information. If a criterion is satisfied based on the recorded information and the source document, an action to be performed is determined. The action is then performed if it is determined that the criterion is satisfied.

In one embodiment, techniques performing an action are provided. The techniques include: accessing recorded information; determining a source document using the recorded information; determining if a criterion is satisfied based on the recorded information and the source document; determining an action to be performed if the criterion is satisfied; and performing the action if it is determined that the criterion is satisfied.

In another embodiment, techniques for performing an action are provided. The techniques include: accessing a first piece of information in recorded information, the first piece of information including information in a source document; comparing the first piece of information to information in the source document to determine information in the source document that matches the first piece of information; determining if a criterion is satisfied based on the first piece of information and matched information in the source document;

determining an action to be performed if the criterion is satisfied; and performing the action if it is determined that the criterion is satisfied.

In yet another embodiment, techniques for determining translated slides of source document slides in a source document are provided. The techniques include: accessing recorded information; determining a source document slide in the source document using the recorded information; determining a translated slide of the source document slide; and communicating the translated slide to a device.

A further understanding of the nature and advantages of the inventions herein may be realized by reference of the remaining portions in the specifications and the attached drawings.

DETAILED DESCRIPTION OF THE INVENTION

Figure 1:
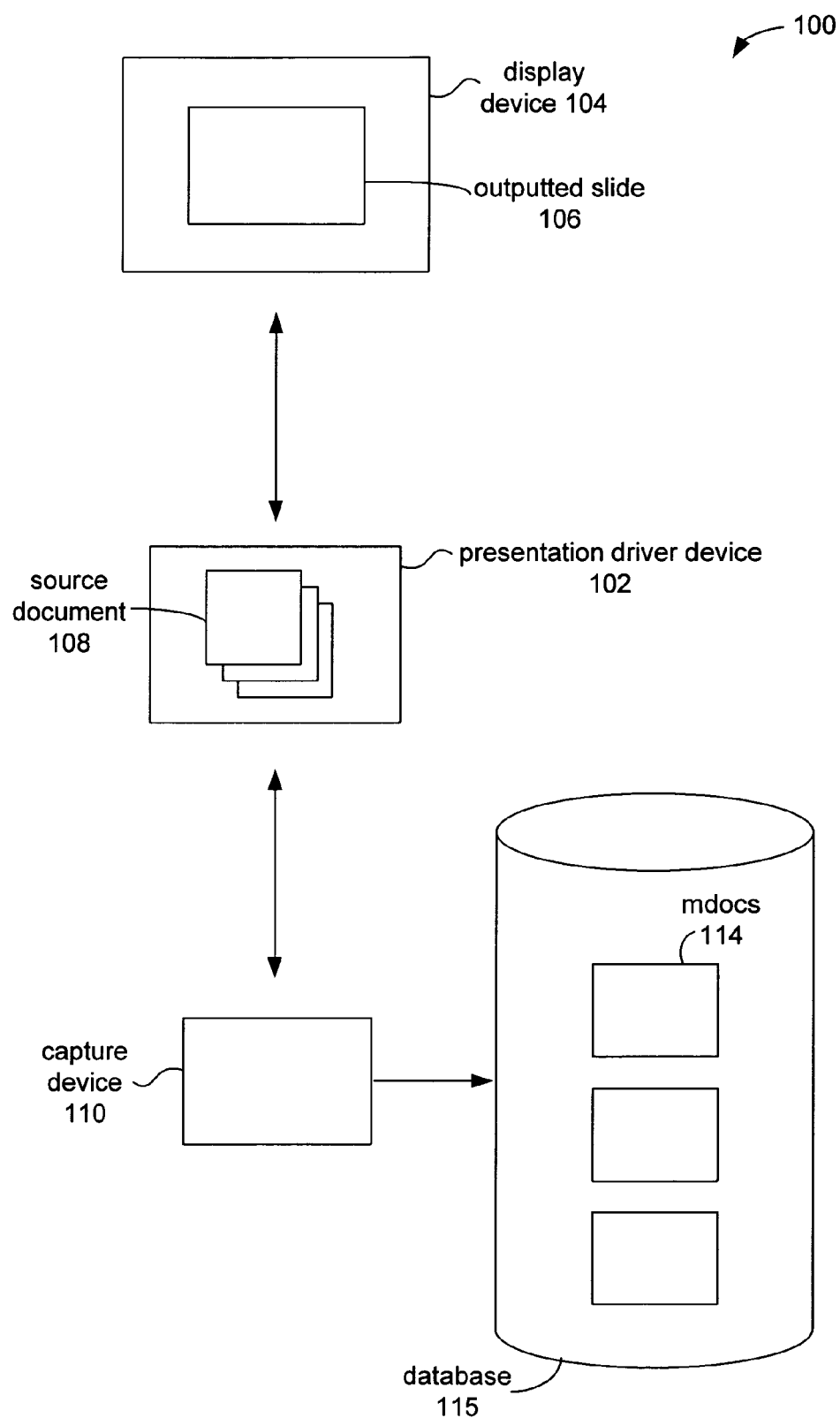
FIG. 1 depicts a simplified block diagram of a system for capturing information used to determine actions to perform according to one embodiment of the present invention.

FIG. 1 depicts a simplified block diagram 100 of a system for capturing information used to determine actions to be performed according to one embodiment of the present invention. It will be apparent that system 100 as depicted in FIG. 1 is merely illustrative of an embodiment incorporating the present invention and does not limit the scope of the invention as recited in the claims. One of ordinary skill in the art will recognize other variations, modifications, and alternatives.

A presentation driver device 102 and a display device 104 are used to output slides and other information that may be stored in a source document 108 or a symbolic presentation file. For example, slides from a Powerpoint™ (PPT) presentation may be output and displayed on display device 104. In one embodiment, the term "source document" as used in this application is intended to refer to any document stored in electronic form. For example, a document that is created using an application program and whose contents or portions thereof may be a source document. Also, source documents may be scanned documents, a PDF version of a document, an image of a document, etc. The contents of source document 108 may include slides, images, text information, etc. A source document may comprise one or more portions. For example, a PPT document may comprise one or more pages. Each page of a PPT document may comprise one or more slides. The portions of source document 108 will be referred to as slides for discussion purposes but it will be understood that a slide may also be one or more images, one or more pages of a document, etc. Source document 108 may be created using one or more application programs. For example, a PPT document may be created using an application program, such as Microsoft's Powerpoint™. Source document 108 is an electronic document that may be manipulated and edited using the application program that created it, or any other program.

In one embodiment, source document 108 is different than a captured image of a slide, which has not been created by an application program and is often not directly editable by the application program. For example, a PPT document comprising one or more slides created using a Powerpoint™ application program can be easily edited by the Powerpoint™ application. In contrast, a joint photographics group (JPEG) image of the displayed slide is not created by the Powerpoint™ application but is recorded information. Although a PPT document may contain JPEG images, the JPEG images are included in a slide created by a PPT application.

When a slide of source document 108 is displayed on display device 104, it is referred to as an outputted slide 106. For example, outputted slide 106 is a slide or image from source document 108 that has been outputted and displayed.

While a presenter is giving a presentation, the presenter may display slides from source document 108 on display device 104. While a slide is being displayed on display device 104, the presenter will then often describe or explain the contents of the displayed slide. For example, the presenter may embellish on the text or images displayed in multimedia document 114. Attendees of the presentation may also comment on the displayed slide (e.g., ask questions about the slide, etc.). The information output during a presentation, including information output by display device 104, by the presenter, by attendees of the presentation, or any information captured during the presentation may be captured or recorded using one or more capture devices 110. Examples of presentations include lectures, meetings, speeches, conferences, classes, demonstrations, etc.

Information recorded or captured during a presentation may include text information, graphics information, animation information, sound (audio) information, video information, slides information, whiteboard images information, and other types of information. For example, a video recording of presentation may comprise video information and/or audio information. In certain instances the video recording may also comprise close-captioned (CC) text information which comprises material related to the video information, and in many cases, is an exact representation of the speech contained in the audio portions of the video recording. Recorded information is also used to refer to information comprising one or more objects wherein the objects include information of different types. For example, objects included in recorded information may comprise text information, graphics information, animation information, sound (audio) information, video information, slides information, whiteboard images information, and other types of information.

In one embodiment, the recorded information may be stored in a multimedia document 114 in a database 115. Alternatively, the recorded information may be processed in real-time as it is captured. The term "multimedia document" as used in this application is intended to refer to any electronic storage unit (e.g., a file, a directory, etc.) that stores recorded information. Various different formats may be used to store the recorded information. These formats include various MPEG formats (e.g., MPEG 1, MPEG 2, MPEG 4, MPEG 7, etc.), MP3 format, SMIL format, HTML+TIME format, WMF (Windows Media Format), RM (Real Media) format, Quicktime format, Shockwave format, various streaming media formats, formats being developed by the engineering community, proprietary and customary formats, and others. Examples of multimedia documents 114 include video recordings, MPEG files, news broadcast recordings, presentation recordings, recorded meetings, classroom lecture recordings, broadcast television programs, papers, or the like.

Capture device 110 is configured to capture information presented at a presentation. Various different types of information output during a presentation may be captured or recorded by capture devices 118 including audio information, video information, images of slides or photos, whiteboard information, text information, and the like. For purposes of this application, the term "presented" is intended to include displayed, output, spoken, etc. For purposes of this application, the term "capture device" is intended to refer to any device, system, apparatus, or application that is configured to capture or record information of one or more types. Examples of capture devices 110 include microphones, video cameras, cameras (both digital and analog), scanners, presentation recorders, screen capture devices (e.g., a whiteboard information capture device), symbolic information capture devices, etc. In addition to capturing the information, capture devices 110 may also be able to capture temporal information associated with the captured information.

A presentation recorder is a device that is able to capture information presented during a presentation, for example, by tapping into and capturing streams of information from an information source. For example, if a computer executing a PowerPoint™ application is used to display slides from a *.ppt file, a presentation recorder may be configured to tap into the video output of the computer and capture keyframes every time a significant difference is detected between displayed video keyframes of the slides. The presentation recorder is also able to capture other types of information such as audio information, video information, slides information stream, etc. The temporal information associated with the captured information indicating when the information was output or captured is then used to synchronize the different types of captured information. Examples of presentation recorders include a screen capture software application, a PowerPoint™ application that allows recording of slides and time elapsed for each slide during a presentation, presentation records described in U.S. application Ser. No. 09/728,560, filed Nov. 30, 2000, U.S. application Ser. No. 09/728,453, filed Nov. 30, 2000, and U.S. application Ser. No. 09/521,252, filed Mar. 8, 2000.

A symbolic information capture device is able to capture information stored in symbolic presentation documents that may be output during a presentation. For example, a symbolic information capture device is able to record slides presented at a presentation as a sequence of images (e.g., as JPEGs, BMPs, etc.). A symbolic information capture device may also be configured to extract the text content of the slides. For example, during a PowerPoint™ slide presentation, a symbolic information capture device may record the slides by capturing slide transitions (e.g., by capturing keyboard commands) and then extracting the presentation images based on these transitions. Whiteboard capture devices may include devices such as a camera appropriately positioned to capture contents of the whiteboard, a screen, a chart, etc.

According to embodiments of the present invention, information from the recorded information is used to determine actions to perform. For example, an image of a slide is captured and used to trigger an action.

In one embodiment, different criteria and actions associated with the criteria are associated with portions of a source document 108. In one embodiment, a criterion is associated with a portion of source document 108 when that criterion is satisfied when it is determined that the portion has been output during a presentation. The associated criterion may be satisfied when recorded information is compared to a portion of source document 108 and matching information is found. Although it is described that a criterion may be satisfied, it will be understood that multiple criteria may be satisfied when a portion of source document 108 is determined to match recorded information. The criteria and actions may be associated with portions of source document 108 using information embedded in source document 108 or information stored separately from source document 108.

When a criterion is satisfied, the associated action is then performed. In one example, the criterion may indicate that an action should be performed when recorded information is compared to and matches a portion of source document 108. When a slide from document 108 is output and displayed, an image of the slide is captured as recorded information. The recorded information is compared to find a match to information in a source document 108. When a match is determined, the criterion has been satisfied. A corresponding action for the criterion is then performed.

Figure 2:
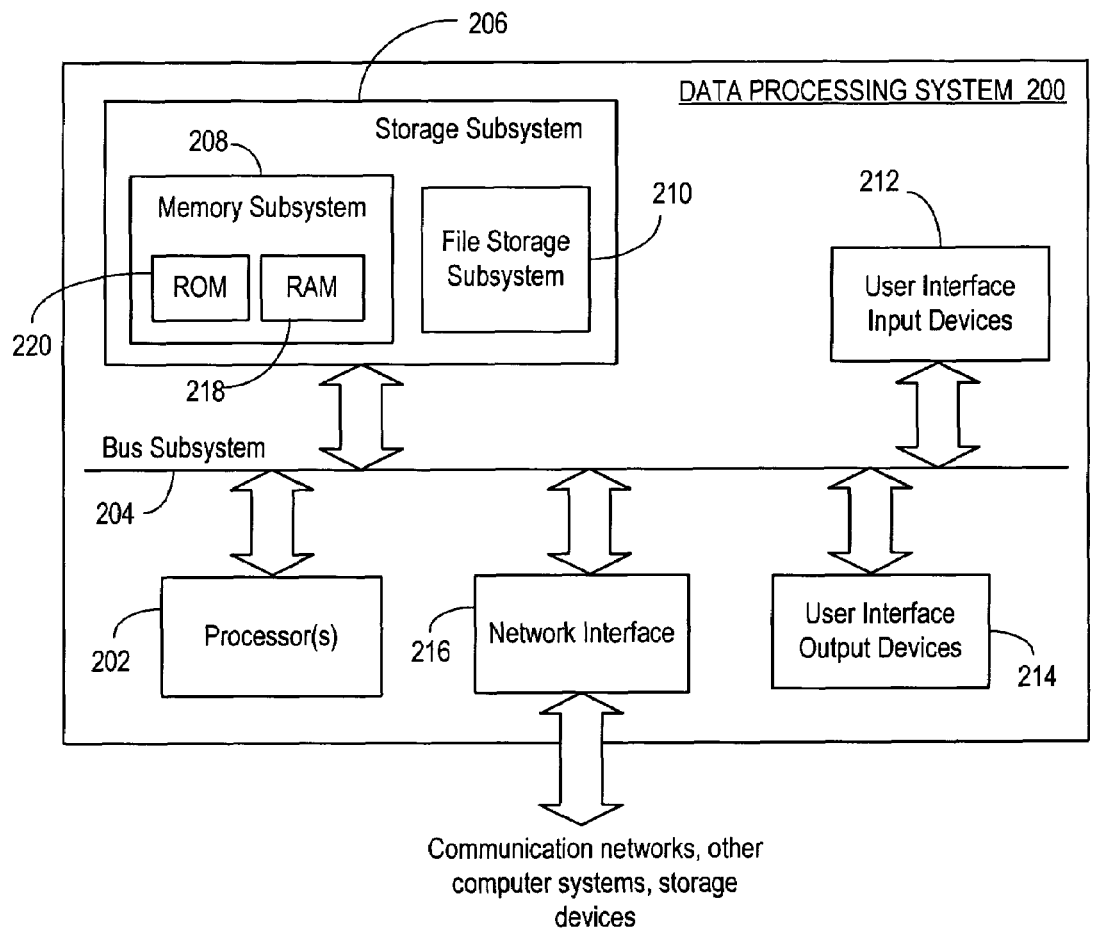
FIG. 2 is a simplified block diagram of a data processing system that may incorporate an embodiment of the present invention.

FIG. 2 is a simplified block diagram of a data processing system 200 that may incorporate an embodiment of the present invention. As shown in FIG. 2, data processing system 200 includes at least one processor 202, which communicates with a number of peripheral devices via a bus subsystem 204. These peripheral devices may include a storage subsystem 206, comprising a memory subsystem 208 and a file storage subsystem 210, user interface input devices 212, user interface output devices 214, and a network interface subsystem 216. The input and output devices allow user interaction with data processing system 202.

Network interface subsystem 216 provides an interface to other computer systems, networks, and storage resources 204. The networks may include the Internet, a local area network (LAN), a wide area network (WAN), a wireless network, an intranet, a private network, a public network, a switched network, or any other suitable communication network. Network interface subsystem 216 serves as an interface for receiving data from other sources and for transmitting data to other sources from data processing system 200. For example, may receive the images to be compared via network interface subsystem 216. Embodiments of network interface subsystem 216 include an Ethernet card, a modem (telephone, satellite, cable, ISDN, etc.), (asynchronous) digital subscriber line (DSL) units, and the like.

User interface input devices 212 may include a keyboard, pointing devices such as a mouse, trackball, touchpad, or graphics tablet, a scanner, a barcode scanner, a touchscreen incorporated into the display, audio input devices such as voice recognition systems, microphones, and other types of input devices. In general, use of the term "input device" is intended to include all possible types of devices and ways to input information to data processing system 200.

User interface output devices 214 may include a display subsystem, a printer, a fax machine, or non-visual displays such as audio output devices. The display subsystem may be a cathode ray tube (CRT), a flat-panel device such as a liquid crystal display (LCD), or a projection device. In general, use of the term "output device" is intended to include all possible types of devices and ways to output information from data processing system 200.

Storage subsystem 206 may be configured to store the basic programming and data constructs that provide the functionality of the present invention. For example, according to an embodiment of the present invention, software modules implementing the functionality of the present invention may be stored in storage subsystem 206. These software modules may be executed by processor(s) 202. Storage subsystem 206 may also provide a repository for storing data used in accordance with the present invention. For example, the images to be compared including the input image and the set of candidate images may be stored in storage subsystem 206. Storage subsystem 206 may comprise memory subsystem 208 and file/disk storage subsystem 210.

Memory subsystem 208 may include a number of memories including a main random access memory (RAM) 218 for storage of instructions and data during program execution and a read only memory (ROM) 220 in which fixed instructions are stored. File storage subsystem 210 provides persistent (non-volatile) storage for program and data files, and may include a hard disk drive, a floppy disk drive along with associated removable media, a Compact Disk Read Only Memory (CD-ROM) drive, an optical drive, removable media cartridges, and other like storage media.

Bus subsystem 204 provides a mechanism for letting the various components and subsystems of data processing system 202 communicate with each other as intended. Although bus subsystem 204 is shown schematically as a single bus, alternative embodiments of the bus subsystem may utilize multiple busses.

Data processing system 200 can be of varying types including a personal computer, a portable computer, a workstation, a network computer, a mainframe, a kiosk, or any other data processing system. Due to the ever-changing nature of computers and networks, the description of data processing system 200 depicted in FIG. 2 is intended only as a specific example for purposes of illustrating the preferred embodiment of the computer system. Many other configurations having more or fewer components than the system depicted in FIG. 2 are possible.

Figure 3:
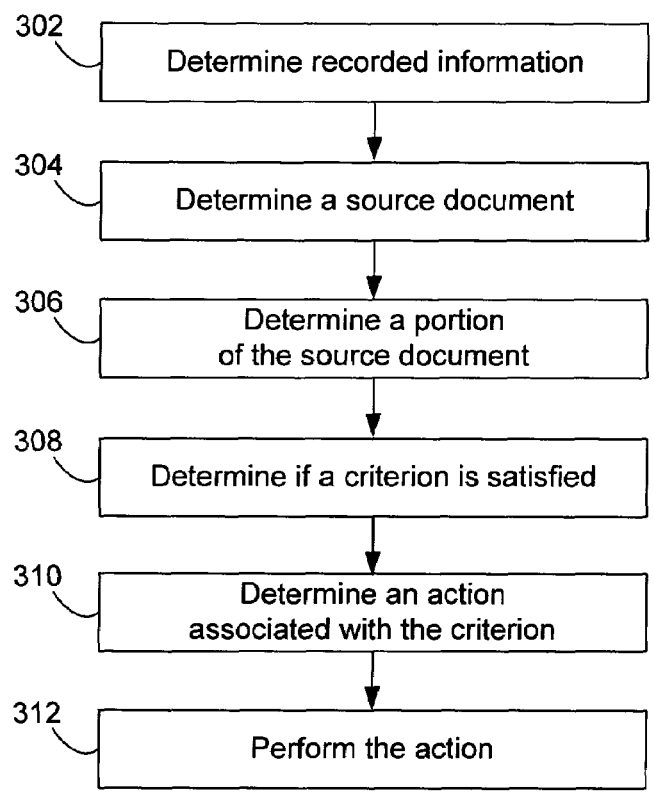
FIG. 3 depicts a simplified flow chart of a method for using recorded information and portions of a source document to determine actions to perform according to one embodiment of the present invention.

FIG. 3 depicts a simplified flow chart 300 of a method for using recorded information and portions of a source document to determine actions to perform according to one embodiment of the present invention. The method may be performed by software modules executed by a data processing system, by hardware modules, or combinations thereof. Flow chart 300 depicted in FIG. 3 is merely illustrative of an embodiment incorporating the present invention and does not limit the scope of the invention as recited in the claims. One of ordinary skill in the art would recognize variations, modifications, and alternatives.

In step 302, recorded information is accessed. In one embodiment, recorded information may be captured while a presentation is being given. For example, images of outputted slides of a source document 108 are captured as the outputted slides are outputted and displayed. In another embodiment, recorded information may be determined from stored information in a multimedia document 114. Recorded information may be stored in various forms and may be stored in a multimedia document 114. Recorded information may comprise images of slides that were captured during a presentation. The recorded information can include information of various types such as audio information, video information, images, keystroke information, etc. A keystroke or voice command may indicate that a certain slide (e.g., a page or slide number) has been displayed or that the next slide has been displayed. For example, a keystroke may specify a slide number (e.g., the number "9" for slide 9) or indicate that a next slide has been displayed. If the keystroke indicates that a next slide has been displayed, the slide in source document 108 that corresponds to the next slide is determined. A voice command can be interpreted in the same way as a keystroke. For example, a voice command may specify a slide number or may specify that a next slide should be displayed.

In step 304, one or more source documents 108 are determined. For discussion purposes, it will be assumed that one source document 108 is determined but any number of source documents 108 may be determined. In one embodiment, source document 108 may be determined using the recorded information accessed in step 302. For example, the recorded information is used to determine source document 108 from a plurality of source documents 108. Information from the recorded information is compared to information stored in source documents 128. Based upon the comparison, the recorded information may include information that matches information in source document 108. If information in the source document matches information in the recorded information, that source document 108 is determined. For example, a slide in a source document 108 may be outputted and displayed and an image of that outputted slide is captured as recorded information. The image in the recorded information can then be matched to information (e.g., an image) in source document 108. Accordingly, source document 108 with the matched image is determined. In other embodiments, recorded information may be a key stroke, a voice command, or other information that may be used to identify a source document 108. For example, the keystrokes may identify a source document being presented, etc.] For example, information identifying a source document 108, such as a filename, may be received as keystroke.

In step 306, a portion of source document 108 determined in step 304 is then determined. In one embodiment, a portion of source document 108 may be a slide that matches information in the recorded information (e.g., an image of the outputted slide). A person skilled in the art will appreciate many methods for matching recorded information with a portion of the source document 108. In one embodiment, image matching techniques disclosed in U.S. patent application Ser. No. 10/412,757, filed on Apr. 11, 2003, entitled "Automated Techniques For Comparing Contents Of Images" may be used and is hereby incorporated by reference for all purposes. For example, an input image (e.g., recorded information) is matched to a set of potential candidate images. The set of candidate images may be slides in source document 108. The extracted images may include keyframes extracted from video information, images captured during a presentation, etc. For each portion of recorded information, images extracted from the recorded information that are included in the information are used as input images.

In another example, the portion of source document 108 may be determined using an identifier for the slide in source document 108. A page number from an image may be recognized in the recorded information. That page number is then used to identify a portion of source document 108. For example, the slide of source document 108 that corresponds to the page number is determined. In other embodiments, the page number may be determined from a key stroke or voice command instead of being recognized in an image.

In step 308, embodiments of the present invention determine if a criterion is satisfied. A criterion may be dependent on any number of factors. For example, a criterion may be satisfied if a portion of source document 108 determined in step 304 is compared to recorded information to determine matching information in the recorded information. For example, recorded information may comprise an image that matches a slide from source document 108. Also, the recorded information may include a keystroke indicating a slide number that matches a slide number in source document 108. When the captured image of the slide matches a portion of source document 108, the criterion has been satisfied.

Information specifying the criteria can be stored with source document 108 or stored separately. In one embodiment, the criterion is associated with source document 108 in that the criterion is satisfied when a portion of source document 108 is determined using recorded information. Also, other information may be used to determine that a criterion has been satisfied, such as metadata associated with or extracted from source document 108 or the recorded information; other documents that are relevant to source document 108 or the recorded information; metadata that identifies a user, source document 108, or recorded information; an agenda of items, etc.

In step 310, an action associated with the criterion is determined. Examples of actions include translating a slide in source document 108, retrieving a translated slide corresponding to an outputted slide from source document 108, sending an e-mail, placing an automatic telephone call, initiating a streaming video connection, etc. A data structure, such as a table, that includes different criteria and actions may be associated with source document 108. When the portion of source document 108 is compared to recorded information and matches information in the recorded information, the table is accessed and searched to determine a criterion that specifies the matched portion of source document 108. A corresponding action corresponding to the criterion may then be performed.

In step 312, the action is performed. In one embodiment, the action may be performed on the determined portion of source document 108. For example, the action is translating text in the portion of source document 108. Other actions may also be triggered, such as sending information to a device. For example, the translated slide may be sent to a device, a notification may be sent to a device, etc.

Accordingly, actions are determined and triggered based on criteria. The criteria may be satisfied when certain events occur. For example, an event may be when a slide from source document 108 is outputted and presented and captured as recorded information. When the recorded information is compared to and matched with information in source document 108, an action is determined and performed.

Figure 4:
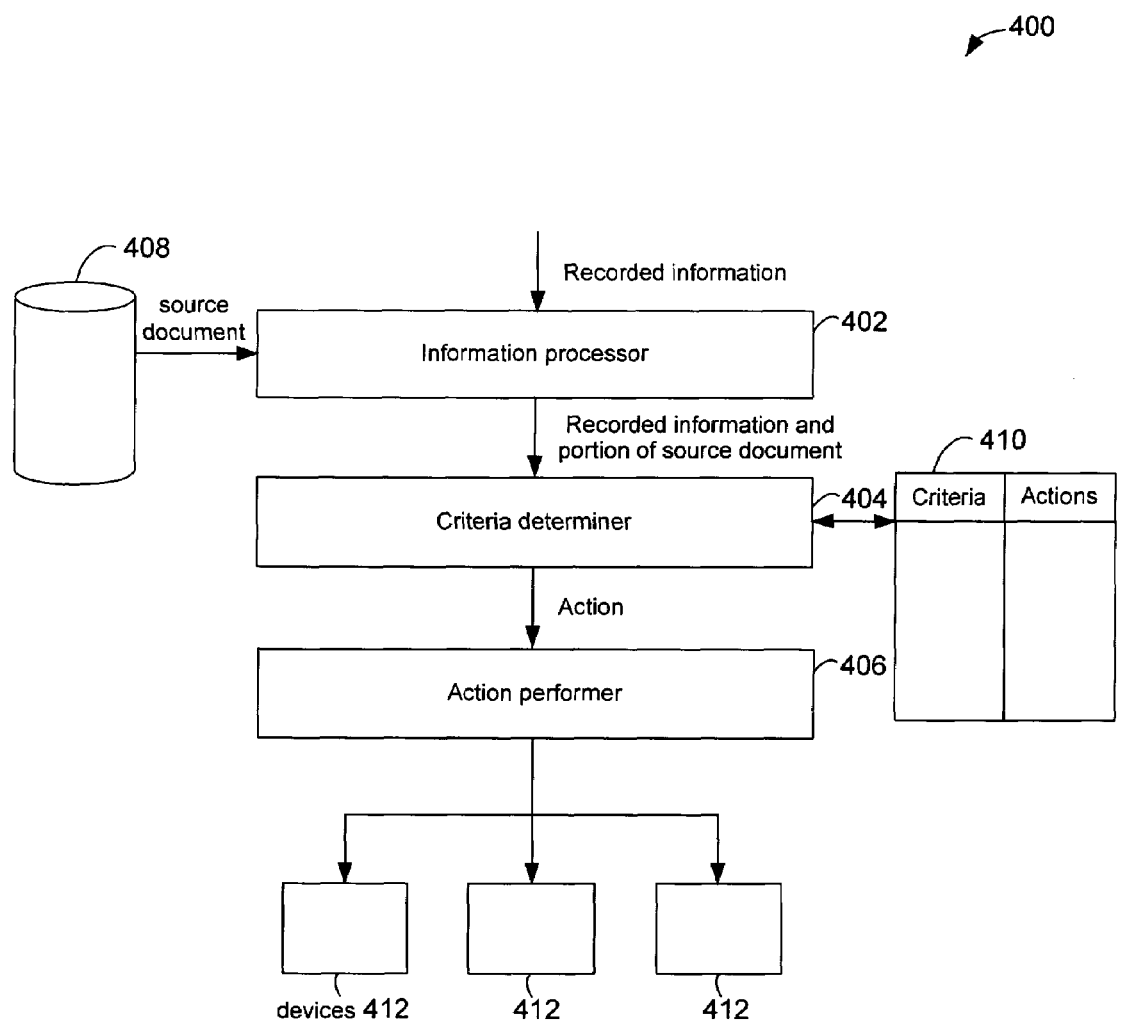
FIG. 4 illustrates a simplified block diagram of a system for performing actions using recorded information and information from a source document according to one embodiment of the present invention.

FIG. 4 illustrates a simplified block diagram of a system 400 for performing actions using recorded information and information from a source document 108 according to one embodiment of the present invention. System 400 includes an information processor 402, a criteria determiner 404, and an action performer 406.

Information processor 402 is configured to identify, based upon the recorded information, one or more source documents 108 from a plurality of source documents whose portions were presented and captured during a presentation. Information processor 402 is then configured to identify portions of the identified source documents based upon the recorded information. A database 408 may store any number of source documents 108. Information processor 402 determines a source document 108 from the stored source documents 108 and a portion of the determined source document 108 using the recorded information. Accordingly, information processor 402 performs the functions described in steps 302, 304, and 306 of FIG. 3.

Criteria determiner 404 receives recorded information and the determined portion of source document 108 from information processor 402 and is configured to determine an action to perform. Criteria determiner 404 determines a criterion that is satisfied using the recorded information and a portion of source document 108 and performs an action corresponding to the criterion. As shown, a table 410 may be used to determine if a criterion has been satisfied. Table 410 may be stored with the determined source document 108 or be stored separately. Table 410 includes one or more criteria and one or more corresponding actions for each criterion. The one or more criteria may be that when a slide in source document is determined. Thus, a criterion may be satisfied when recorded information is compared to source document 108 and it is determined that the recorded information matches a slide in source document 108. When the slide is determined, the criterion has been satisfied and a corresponding action for the criterion is determined. Accordingly, criteria determiner 404 performs the functions described in steps 308 and 310 of FIG. 3.

Action performer 406 receives the determined action from criteria determiner 404 and is configured to perform the action. Action performer 406 may communicate with one or more devices 412. In one embodiment, an action may include performing an action and sending a result of the action to one or more devices 412. Devices 412 may be personal computers (PCs), mobile devices (personal digital assistants (PDAs), cellular phones, etc.), televisions, etc. In one example, action performer 406 may translate a slide in source document 108 and output the translated slide to devices 112. Also, action performer 406 may retrieve a pre-translated slide and output the translated slide to devices 412. A translated slide of a slide being displayed is then displayed on devices 412. In one embodiment, no software plug-ins need to be installed on devices 412 in order for actions to be performed. For example, translated slides of an outputted slide are automatically displayed on devices 412 when a slide is outputted. In one example, a web browser may be used to view the translated slides.

The translations may be done before the presentation or in real time during the presentation. Before user gives a presentation, his presentation slides may be translated to one or more different languages either manually or automatically. Alternatively, while a user is giving a presentation, outputted slides from a source document 108 in a first language (e.g., English) are automatically or manually translated to one or more other languages (e.g., Japanese) in real-time. In one embodiment, manually translated means that the slide is translated by a user.

Recorded information (e.g., a keystroke, a voice command, or an image of an outputted slide) may be used to determine which slide the presenter is presenting. The recorded information is used to determine a source document 108 whose slide is being presented and included in the recorded information. The slide from source document 108 is translated or a previously translated slide is retrieved. The translated slide is then outputted to a user. Accordingly, action performer 406 performs the functions described in step 312 of FIG. 3.

Figure 5:
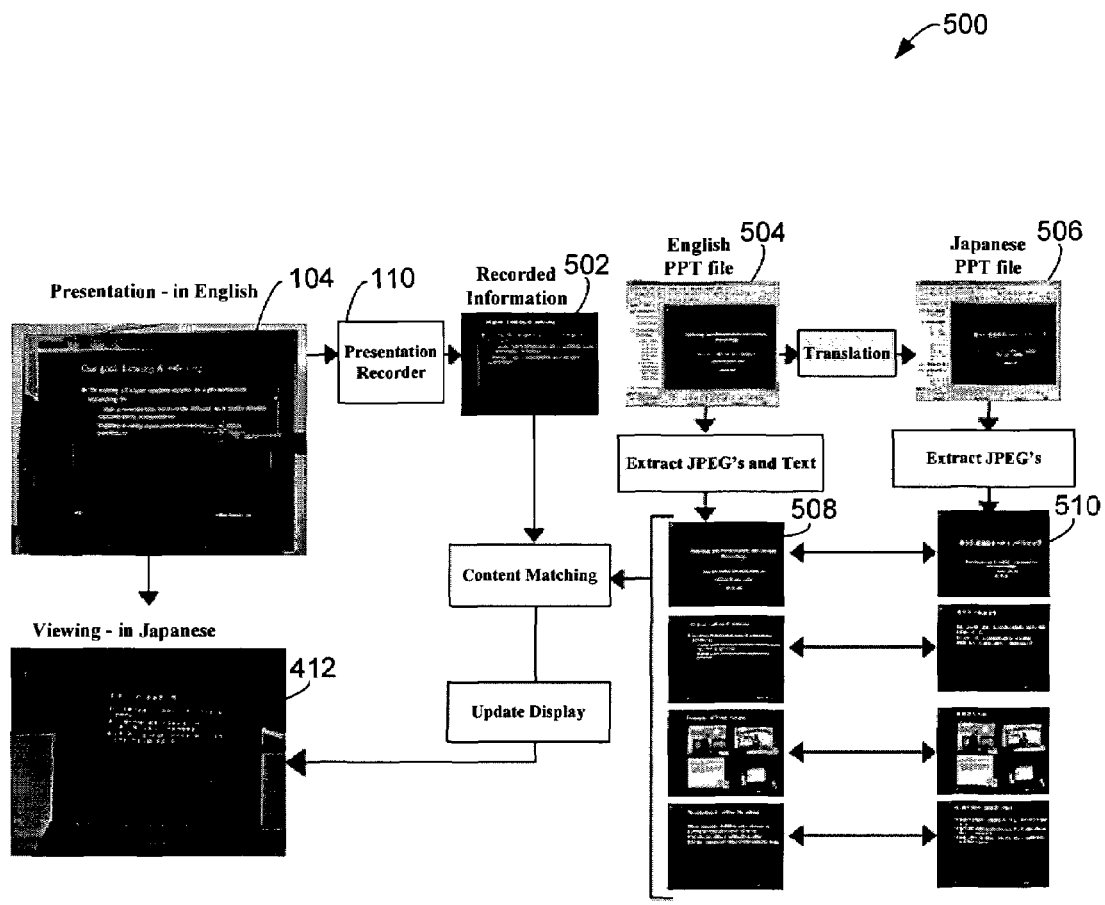
FIG. 5 illustrates a system that depicts the automatic translation of slides being presented according to one embodiment of the present invention.

FIG. 5 illustrates a system 500 that depicts the automatic translation of slides being presented according to one embodiment of the present invention. As shown, system 500 includes a display device 104, capture device 110, and a device 412. Display device 104 displays an outputted slide 106 from a source document 108 in a first language (e.g., English). Presentation recorder 110 captures recorded information 502 from display device 104. Alternatively, recorded information 502 may be retrieved from information in a multimedia document 114. In one embodiment, recorded information 502 includes an image (e.g., a joint photographics experts group (JPEG) image) of a displayed slide in display device 104. Recorded information 502 may also include a keystroke or voice command indicating which slide is being displayed.

A slide is outputted from a source document 108. For example, source document 108 may be a Powerpoint™ file 504 that includes slides in a first language (e.g., English). Slides in PPT file 504 can be translated into another language (e.g., Japanese). The translation may occur at any time (e.g., before recorded information 502 is captured, while recorded information 502 is being captured, or after recorded information 502 is captured). If slides are translated before the presentation, a translated slide is retrieved from a file (e.g., a PPT file 506). If the translation is not done beforehand, a slide in PPT file 504 may be translated in real-time.

In one embodiment, PPT file 504 can be associated with information, such as metadata (e.g., an e-mail of the person who submitted PPT file 504, IP address of a capture device, time stamp, user identifier, original language, directories where the file is stored etc.). The information may be used to determine if a criterion is satisfied or in performing an action. Slides in PPT file 504 can be translated into many languages and individual PPT files may be created for each language. For discussion purposes, slides will be translated into one language but it will be understood that slides can be translated into multiple languages.

Recorded information 502 is matched to information in PPT file 504. As shown, slides 508 include information from PPT file 504. In one embodiment, JPEGs and text from slides in PPT file 504 are extracted. The extracted JPEGs and text are then matched to recorded information 502. For example, information in recorded information 502 is included in a slide 508 in PPT file 504. In one embodiment, an image of a slide extracted from the recorded information matches a slide in a source document 108. The slide may be determined using techniques where information in recorded information 502 is compared to see if there is any matching information to information in PPT file 504. Also, a slide number may be identified in an image in recorded information 502 and the slide number is used to retrieve a slide in PPT file 504. Keystrokes or voice commands stored as part of the recorded information may also be used to identify a slide in PPT file 504.

Once the slide in PPT file 504 is identified, a translated slide 510 corresponding to the identified slide in PPT file 504 is determined. In one embodiment, translated slide 510 may have been previously translated based upon slide 508 prior to processing of the recorded information. In another embodiment, slide 508 may be translated into slide 510 in real-time upon receiving a signal to perform the translation.

Translated slide 510 is then communicated to device 412, which displays the translated slide. Thus, instead of viewing a first slide in a first language, a translated slide of the first slide in a second language is automatically displayed when the first slide is outputted and displayed on display 104. If a matching slide in PPT file 504 is not found, the outputted slide displayed on display 104 may be displayed on device 412. The above process may be repeated for any number of outputted slides from PPT file 504.

In another embodiment, a presentation may be given as above and translated slides are determined. Instead of outputting the slides in real-time, the translated slides may be saved to a file. As slides are displayed, the slides are translated or translated slides are retrieved and saved to the file. A user can then view the translated version of the slides for the presentation at a later time.

In another example, information in an agenda may be used to determine actions to perform. When an agenda item is displayed and captured as recorded information, a notification that the agenda item is being discussed is sent.

While the present invention has been described using a particular combination of hardware and software implemented in the form of control logic, it should be recognized that other combinations of hardware and software are also within the scope of the present invention. The present invention may be implemented only in hardware, or only in software, or using combinations thereof.

The above description is illustrative but not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A method for providing translated information, the method comprising:
    accessing recorded information, the recorded information including information recorded during a presentation of source information;
    comparing the recorded information to a source document, the source document being separate from the recorded information and being determined to include information corresponding to at least a portion of the source information presented during the presentation;
    determining whether a portion of the source document corresponds to a portion of the recorded information, such that a criterion is satisfied; and
    when the criterion is satisfied, communicating a translated version of the portion of the source document to at least one device, whereby the at least one device is operable to display the translated version of the source document while accessing the portion of the accessed recorded information.

2. The method of claim 1, wherein the information in the recorded information comprises an image of information outputted from the source document.

3. The method of claim 2, wherein determining the source document comprises comparing an image in the source document with the image of information outputted from the source document to determine if the image in the source document matches the image of information outputted from the source document.

4. The method of claim 1, wherein the information from the source document comprises an image.

5. The method of claim 1, wherein determining if the criterion is satisfied comprises:
    associating information from the recorded information with the information in the source document; and
    associating the information in the source document with information for the criterion.

6. The method of claim 1, wherein the information associated with the source document is embedded in the source document.

7. The method of claim 1, wherein the recorded information comprises information identifying the information in the source document that has been outputted.

8. The method of claim 1, wherein the recorded information comprises an identifier, wherein the identifier is used to determine the information in the source document.

9. A method for providing translated information, the method comprising:
    accessing a first piece of information in recorded information, the recorded information including information recorded during a presentation of source information;
    comparing the first piece of information to a source document, the source document being separate from the recorded information and being determined to include information corresponding to at least a portion of the source information presented during the presentation;
    determining whether information in the source document corresponds to the first piece of information in the recorded information, such that a criterion is satisfied;
    when the criterion is satisfied, communicating a translated version of the information in the source document to at least one device, whereby the at least one device is operable to display the translated version of the source document while accessing the accessed recorded information.

10. The method of claim 9, wherein the first piece of information comprises an image of a slide in the source document.

11. The method of claim 9, wherein the information in the source document comprises an image of a slide.

12. The method of claim 9, wherein determining if the criterion is satisfied comprises using the information in the source document specifying the criterion to determine if the criterion is satisfied.

13. The method of claim 9, wherein the information associated with the source document is embedded in the source document.

14. The method of claim 9, wherein the recorded information comprises information identifying the information in the source document that has been outputted.

15. The method of claim 9, wherein the recorded information comprises an identifier, wherein the identifier is used to determine the information in the source document.

16. A method for determining translated slides of source document slides in a source document, the method comprising:
    accessing recorded information, the recorded information including information recorded during a presentation of source information from at least one source document separate from the recorded information;
    comparing a source document slide in the at least one source document to an image contained in the recorded information, a criterion being satisfied if the source document slide corresponds to the image; and
    communicating a translated slide to a device when the criterion is satisfied, the translated slide including a translation of at least a portion of the source document slide, whereby the device is operable to display the translated slide while accessing the portion of the accessed recorded information.

17. The method of claim 16, wherein determining the translated slide comprises translating text of the source document slide to generate the translated slide.

18. The method of claim 16, wherein determining the translated slide comprises:
    determining a storage location of the translated slide; and
    retrieving the translated slide from the storage location.

19. The method of claim 16, wherein communicating the translated slide to a device comprises causing the translated slide to be displayed on the device.

20. The method of claim 16, wherein communicating the translated slide to a device comprises storing the translated slide.

21. The method of claim 16, wherein the recorded information comprises an image of an outputted source document slide.

22. The method of claim 21, wherein determining the source document slide comprises comparing the image of the outputted source document slide to information in the source document slide to determine if the image of the outputted source document matches the information in the source document slide.

23. The method of claim 21, wherein the recorded information comprises information indicating that the source document slide in the source document has been outputted.

24. The method of claim 21, wherein the recorded information comprises a slide number, wherein the slide number is used to determine the source document slide.

25. A data processing system for providing translated information, the data processing system comprising:
- a processor;
- a memory coupled to the processor, the memory configured to store a plurality of code modules for execution by the processor, the plurality of code modules comprising:
  - a code module for accessing recorded information, the recorded information including information recorded during a presentation of source information;
  - a code module for comparing the recorded information to a source document, the source document being separate from the recorded information and being determined to include information corresponding to at least a portion of the source information presented during the presentation;
  - a code module for determining whether a portion of the source information in the source document corresponds to a portion of the recorded information, such that a criterion is satisfied; and
  - a code module for communicating a translated version of the portion of the source information in the source document to a device when the criterion is satisfied, whereby the device is operable to display the translated version of the source document while accessing the accessed recorded information.

26. The data processing system of claim 25, wherein the information in the recorded information comprises an image of information outputted from the source document.

27. The data processing system of claim 26, wherein the code module for determining the source document comprises a code module for comparing an image in the source document with the image of information outputted from the source document to determine if the image in the source document matches the image of information outputted from the source document.

28. The data processing system of claim 26, wherein the code module for determining if the criterion is satisfied comprises:
- a code module for associating information from the recorded information with the information in the source document; and
- a code module for associating the information in the source document with information for the criterion.

29. The data processing system of claim 28, wherein the information associated with the source document is embedded in the source document.

30. The data processing system of claim 26, wherein the recorded information comprises information identifying the information in the source document that has been outputted.

31. The data processing system of claim 26, wherein the recorded information comprises an identifier, wherein the identifier is used to determine the information in the source document.

32. The data processing system of claim 25, wherein the information from the source document comprises an image.

33. A data processing system for providing translated information, the data processing system comprising:
- a processor;
- a display device; and
- a memory coupled to the processor, the memory configured to store a plurality of code modules for execution by the processor, the plurality of code modules comprising:
  - a code module for accessing a first piece of information in recorded information, the recorded information including information recorded during a presentation of source information;
  - a code module for comparing the first piece of information to a source document, the source document being separate from the recorded information and being determined to include information corresponding to at least a portion of the source information presented during the presentation;
  - a code module for determining whether information in the source document corresponds to the first piece of information in the recorded information, such that a criterion is satisfied; and
  - a code module for communicating a translated version of the information in the source document to the display device when the criterion is satisfied, whereby the device is operable to display the translated version of the source document while accessing the accessed recorded information.

34. The data processing of claim 33, wherein the first piece of information comprises an image of a slide in the source document.

35. The data processing of claim 33, wherein the information in the source document comprises an image of a slide.

36. The data processing of claim 33, wherein the code module for determining if the criterion is satisfied comprises a code module for using the information in the source document specifying the criterion to determine if the criterion is satisfied.

37. The data processing of claim 36, wherein the information associated with the source document is embedded in the source document.

38. The data processing of claim 33, wherein the recorded information comprises information identifying the information in the source document that has been outputted.

39. The method of claim 33, wherein the recorded information comprises an identifier, wherein the identifier is used to determine the information in the source document.

40. A data processing system for determining translated slides of source document slides in a source document, the data processing system comprising:
- a processor;
- a memory coupled to the processor, the memory configured to store a plurality of code modules for execution by the processor, the plurality of code modules comprising:
  - a code module for accessing recorded information, the recorded information including information recorded during a presentation of source information from at least one source document separate from the recorded information;
  - a code module for comparing a source document slide in the at least one source document to an image contained in the recorded information, a criterion being satisfied if the source document slide corresponds to the image; and a code module for communicating a translated slide to a device when the criterion is satisfied, the translated slide including a translation of at least a portion of the source document slide, whereby the device is operable to display the translated slide while accessing the portion of the accessed recorded information.

41. The data processing system of claim 40, wherein the code module determining the translated slide comprises a code module translating text of the source document slide to generate the translated slide.

42. The data processing system of claim 40, wherein the code module for determining the translated slide comprises:
   a code module for determining a storage location of the translated slide; and
   a code module for retrieving the translated slide from the storage location.

43. The data processing system of claim 40, wherein the code module for communicating the translated slide to a device comprises a code module for causing the translated slide to be displayed on the device.

44. The data processing system of claim 40, wherein the code module for communicating the translated slide to a device comprises a code module storing the translated slide.

45. The data processing system of claim 40, wherein the recorded information comprises an image of an outputted source document slide.

46. The data processing system of claim 45, wherein the code module for determining the source document slide comprises a code module comparing the image of the outputted source document slide to information in the source document slide to determine if the image of the outputted source document matches the information in the source document slide.

47. The data processing system of claim 45, wherein the recorded information comprises information indicating that the source document slide in the source document has been outputted.

48. The data processing system of claim 45, wherein the recorded information comprises a slide number, wherein the slide number is used to determine the source document slide.

49. A computer program product stored on a computer-readable storage medium and including executable instructions for providing translated information, the computer program product comprising:
   code for accessing recorded information, the recorded information including information recorded during a presentation of source information;
   code for comparing the recorded information to a source document, the source document being separate from the recorded information and being determined to include information corresponding to at least a portion of the source information presented during the presentation;
   code for determining whether a portion of the source document corresponds to a portion of the recorded information, such that a criterion is satisfied; and
   code for communicating translated information to a device when the criterion is satisfied, the translated information including a translation of at least a portion of the source information, whereby the device is operable to display the translated information while accessing the portion of the accessed recorded information.

50. The computer program product of claim 49, wherein the information in the recorded information comprises an image of information outputted from the source document.

51. The method of claim 50, wherein the code for determining the source document comprises code for matching comparing an image in the source document with the image of information outputted from the source document to determine if the image in the source document matches the image of information outputted from the source document.

52. The computer program product of claim 49, wherein the code for determining if the criterion is satisfied comprises:
   code for associating information from the recorded information with the information in the source document; and
   code for associating the information in the source document with information for the criterion.

53. The computer program product of claim 49, wherein information for the criterion and action associated with the criterion is associated with the source document.

54. The computer program product of claim 53, wherein the information associated with the source document is embedded in the source document.

55. The computer program product of claim 49, wherein the recorded information comprises information identifying the information in the source document that has been outputted.

56. The computer program product of claim 49, wherein the recorded information comprises an identifier, wherein the identifier is used to determine the information in the source document.

57. A computer program product stored on a computer-readable storage medium and including executable instructions for providing translated information, the computer program product comprising:
   code for accessing a first piece of information in recorded information, the recorded information including information recorded during a presentation of source information;
   code for comparing the first piece of information to a source document, the source document being separate from the recorded information and being determined to include information corresponding to at least a portion of the source information presented during the presentation;
   code for determining whether information in the source document corresponds to the first piece of information in the recorded information, such that a criterion is satisfied; and
   code for communicating translated information to a device when the criterion is satisfied, the translated information including a translation of at least a portion of the source information, whereby the device is operable to display the translated information while accessing the portion of the accessed recorded information.

58. The computer program product of claim 57, wherein the first piece of information comprises an image of a slide in the source document.

59. The computer program product of claim 57, wherein the information in the source document comprises an image of a slide.

60. The computer program product of claim 57, wherein the code for determining if the criterion is satisfied comprises code for using the information in the source document specifying the criterion to determine if the criterion is satisfied.

61. The computer program product of claim 57, wherein the code for performing the action comprises code for outputting translated information of the information in the source document.

62. The computer program product of claim 57, wherein information for the criterion and action associated with the criterion is associated with the source document.

63. The computer program product of claim 62, wherein the information associated with the source document is embedded in the source document.

64. The computer program product of claim 57, wherein the recorded information comprises information identifying the information in the source document that has been outputted.

65. The computer program product of claim 57, wherein the recorded information comprises an identifier, wherein the identifier is used to determine the information in the source document.

66. A computer program product stored on a computer-readable storage medium and including executable instructions for determining translated slides of source document slides in a source document, the computer program product comprising:
   code for accessing recorded information, the recorded information including information recorded during a presentation of source information from at least one source document separate from the recorded information;
   code for comparing a source document slide in the at least one source document to an image contained in the recorded information, a criterion being satisfied if the source document slide corresponds to the image; and
   code for communicating a translated slide to a device when the criterion is satisfied, the translated slide including a translation of at least a portion of the source document slide, whereby the device is operable to display the translated slide while accessing the portion of the accessed recorded information.

67. The computer program product of claim 66, wherein the code for determining the translated slide comprises:
   code for determining a storage location of the translated slide; and
   code for retrieving the translated slide from the storage location.

68. The computer program product of claim 66, wherein the recorded information comprises an image of an outputted source document slide.

69. The computer program product of claim 68, wherein the code for determining the source document slide comprises code for comparing the image of the outputted source document slide to information in the source document slide to determine if the image of the outputted source document matches the information in the source document slide.

70. The computer program product of claim 66, wherein the recorded information comprises information indicating that the source document slide in the source document has been outputted.

71. The computer program product of claim 66, wherein the recorded information comprises a slide number, wherein the slide number is used to determine the source document slide.

* * * * *